United States Patent
Hong et al.

(10) Patent No.: US 12,101,419 B2
(45) Date of Patent: Sep. 24, 2024

(54) BLOCKCHAIN NETWORK-BASED VIRTUAL COMMON ID SERVICE METHOD AND SERVICE PROVISION SERVER USING SAME

(71) Applicant: CPLABS, INC., Seongnam-si (KR)

(72) Inventors: Jay Wu Hong, Seoul (KR); Kyoo Hyung Han, Seoul (KR)

(*) Notice: Subject to any disclaimer, the term of this patent is extended or adjusted under 35 U.S.C. 154(b) by 0 days.

(21) Appl. No.: 17/787,507

(22) PCT Filed: Oct. 13, 2020

(86) PCT No.: PCT/KR2020/013955
§ 371 (c)(1),
(2) Date: Nov. 21, 2022

(87) PCT Pub. No.: WO2021/137397
PCT Pub. Date: Jul. 8, 2021

(65) Prior Publication Data
US 2023/0073894 A1    Mar. 9, 2023

(30) Foreign Application Priority Data
Dec. 31, 2019    (KR) .................. 10-2019-0180073

(51) Int. Cl.
*H04L 9/00*    (2022.01)
*H04L 9/08*    (2006.01)

(52) U.S. Cl.
CPC ............. *H04L 9/50* (2022.05); *H04L 9/0819* (2013.01); *H04L 9/0861* (2013.01)

(58) Field of Classification Search
CPC ....... H04L 9/50; H04L 9/0819; H04L 9/0861; H04L 63/0815; H04L 9/3228; H04L 9/3236; H04L 67/53
See application file for complete search history.

(56) References Cited

U.S. PATENT DOCUMENTS 9,768,962 B2 * 9/2017 Acar ...................... H04L 9/3226
10,701,054 B2 * 6/2020 Padmanabhan ..... H04L 63/0428
(Continued)

FOREIGN PATENT DOCUMENTS

KR      2011017165 A      2/2011
KR     20180086679 A      8/2018
(Continued)

OTHER PUBLICATIONS

Foreign Communication from Related Application—Korean Office Action with English Translation dated Mar. 30, 2020, KR Patent Application No. 10-2019-0180073 filed Dec. 31, 2019, 6 pages.
(Continued)

*Primary Examiner* — Oleg Korsak
(74) *Attorney, Agent, or Firm* — Conley Rose, P.C.; Rodney B. Carroll (57) ABSTRACT

The present invention relates to a blockchain network-based virtual common ID service method, the method comprising: registering a user ID and ID data in each of service provision servers; registering the ID data as a user data set associated with common ID data in a blockchain network; when a particular ID requesting transaction including another ID data, another user data set, and proof information relating to another ID data is acquired from another service provision server among the service provision servers in a state where an ID commitment of each of the service provision servers is registered in the blockchain network, acquiring another ID commitment by a particular service provision server among the service provision servers; verifying another ID data with reference to the proof information and another ID commitment; identifying a particular user ID corresponding to particular ID data; and transmitting the identified particular user ID to another service provision server.

16 Claims, 5 Drawing Sheets

(56) References Cited

U.S. PATENT DOCUMENTS

| | | | |
|---|---|---|---|
| 2011/0022656 A1* | 1/2011 | Mori | H04L 63/12 |
| | | | 709/203 |
| 2011/0093939 A1* | 4/2011 | Barbour | G06F 21/40 |
| | | | 726/16 |
| 2014/0281525 A1* | 9/2014 | Acar | H04L 9/3226 |
| | | | 713/168 |
| 2015/0235017 A1* | 8/2015 | Oberheide | G06F 21/34 |
| | | | 726/6 |
| 2019/0034924 A1* | 1/2019 | Prabhu | G06Q 20/3821 |
| 2019/0182047 A1* | 6/2019 | Andreina | H04L 63/0428 |
| 2020/0067907 A1* | 2/2020 | Avetisov | H04L 9/3234 |
| 2020/0134586 A1* | 4/2020 | Wu | H04L 9/0825 |
| 2020/0145196 A1* | 5/2020 | Lin | H04L 9/3247 |
| 2020/0195629 A1* | 6/2020 | Kwon | H04L 63/0884 |
| 2020/0412554 A1* | 12/2020 | Lee | G06F 16/9035 |
| 2021/0051013 A1* | 2/2021 | Li | G06F 21/64 |

FOREIGN PATENT DOCUMENTS

| | | | |
|---|---|---|---|
| KR | 101985179 | B1 | 9/2019 |
| KR | 2019011425 | A | 10/2019 |
| KR | 2019014353 | A | 12/2019 |
| WO | 2021137397 | A1 | 7/2021 |

OTHER PUBLICATIONS

Foreign Communication from Related Application—International Search Report of the International Searching Authority, International Patent Application No. PCT/KR2020/013955 dated Jan. 22, 2021, 4 pages.

* cited by examiner

BLOCKCHAIN NETWORK-BASED VIRTUAL COMMON ID SERVICE METHOD AND SERVICE PROVISION SERVER USING SAME

CROSS REFERENCE TO RELATED APPLICATION

This application is a filing under 35 U.S.C. 371 of International Application No. PCT/KR2020/013955, filed Oct. 13, 2020, which claims the benefit of Korean Non-Provisional Patent Application No. 10-2019-0180073, filed on Dec. 31, 2019, the entirety of the contents of both applications being incorporated herein by reference.

FIELD OF THE DISCLOSURE

The present disclosure relates to a method of managing a virtual common ID based on a blockchain network and a service providing server using the same; and more particularly, the method of managing the virtual common ID based on the blockchain network capable of integrating an ID registered in one service provider with other IDs registered in other service providers without using a common ID and the service providing server using the same.

BACKGROUND OF THE INVENTION

Social Security Number serves as an ID to be used in various industries as a simple way to uniquely identify a specific person.

Recently, users are experiencing damages due to various hacking attempts made online by exploiting personal information.

In order to solve this problem, each identity authenticating institution that performs user authentication uses different user IDs for different service providers.

In addition, since it is difficult to relate pieces of information among the service providers when the different user IDs are used for the different service providers, association information generated by using identifying information such as a user's social security number and secret information kept by an identity authenticating institution is used instead.

However, although it becomes possible to relate the pieces of information among the service providers by using the association information, if the association information is leaked from even one service provider, fatal consequences of a personal information leakage may occur, arising a need to change the association information used by all of the service providers.

SUMMARY OF THE INVENTION

It is an object of the present invention to solve all the aforementioned problems.

It is another object of the present invention to relate pieces of information among service providers without needing to use association information even though different IDs are used for the different service providers.

It is still another object of the present invention to relate the pieces of information among the service providers while preventing a prediction of each of user IDs provided by each of the service providers.

It is still yet another object of the present invention to integrate an ID generated for a user by a service provider with each of other IDs generated for the user by each of other service providers without using a common ID.

It is still yet another object of the present invention to prevent the IDs generated for each of the service providers from being disclosed to an unauthorized entity using other disclosed user information.

In accordance with one aspect of the present disclosure there is provided a method for managing a virtual common ID based on a blockchain network, including steps of: (a) on condition that (i) (i-1) each of a first user ID to an n-th user ID corresponding to a user and (i-2) each of a first ID data to an n-th ID data corresponding to each of the first user ID to the n-th user ID have been registered in each of a first service providing server to an n-th service providing server, (ii) a user data set including the first ID data to the n-th ID data, corresponding to a common ID data of the user, has been registered in the blockchain network, and (iii) each of a first ID commitment to an n-th ID commitment, each of which is generated by applying an operation of a commitment scheme on each of a first secret key and the first ID data to an n-th secret key and the n-th ID data corresponding to each of the first service providing server to the n-th service providing server, have been registered in the blockchain network, in response to acquiring a specific ID requesting transaction, corresponding to the user, including (i) another ID data, corresponding to the user, of another service providing server among the first service providing server to the n-th service providing server, (ii) the user data set acquired from the blockchain network by using said another ID data through said another service providing server, and (iii) proof information for proving ownership of said another ID data, a specific service providing server, among the first service providing server to the n-th service providing server, acquiring another ID commitment corresponding to said another ID data from the blockchain network by using said another ID data acquired from the specific ID requesting transaction; (b) the specific service providing server determining whether said another ID data is authenticated by referring to said another ID commitment acquired from the blockchain network and the proof information acquired from the specific ID requesting transaction; and (c) in response to said another ID data being authenticated, the specific service providing server confirming a specific user ID corresponding to a specific ID data, among the first ID data to the n-th ID data, included in the user data set, and then transmitting the confirmed specific user ID to said another service providing server.

As one example, before the step of (a), the method further includes steps of: (a1) in response acquiring a user ID 0.1 generating request from a user device of the user, the specific service providing server (i) generating the specific user ID corresponding to the user, (ii) generating the specific ID data obtained by processing the specific user ID, and (iii) generating specific server trap information by using a specific secret key of the specific service providing server; and (a2) the specific service providing server transmitting the specific ID data and the specific server trap information to a certification-supporting server, to thereby instruct the certification-supporting server to (i) generate a specific ID commitment by applying the operation of the commitment scheme on the specific ID data and the specific server trap information, (ii) register the specific ID commitment in the blockchain network, (iii) register the specific ID data in the blockchain network, and thus (iv) allow the specific ID data to correspond to the user data set.

As one example, generators of the commitment scheme are represented as g and h, and said another ID commitment is represented as comm(another user ID)=g^(said another ID data)*h^(another secret key), wherein said g^(said another ID data) represents said g to the power of said another ID data, and wherein said h^(said another secret key) represents said h to the power of said another secret key, and wherein, at the step of (a), in response to said another service providing server (i) generating a random nonce x and a random nonce y and (ii) generating and transmitting first proof information g^x*h^y corresponding to the random nonce x and the random nonce y by using the commitment scheme, the specific service providing server transmits a random nonce c to said another service providing server, and instructs said another service providing server to generate (2_1)-st proof information x'=x+c*(said another ID data) and (2_2)-nd proof information y'=y+c*(said another secret key) by referring to said another ID data, said another secret key, the random nonce x, the random nonce y, and the random nonce c, to thereby generate the proof information, and wherein, at the step of (b), the specific service providing server checks whether (1) a first reference value g^x*h^y*comm(said another ID data)^c generated by referring to the first proof information g^x*h^y and said another ID commitment comm(said another ID data) and (2) a second reference value g^x' *h^y' generated by referring to the (2_1)-st proof information x' and the (2_2)-nd proof information y' correspond with each other, thus authenticating said another ID data.

As one example, generators of the commitment scheme are represented as g and h, and said another ID commitment is represented as comm(said another ID data)=g^(said another ID data)*h^(another secret key), wherein said g^(said another ID data) represents g to the power of said another ID data, and wherein said h^(said another secret key) represents h to the power of said another secret key, and wherein, at the step of (a), said another service providing server generates (i) a random nonce x and a random nonce y, (ii) first proof information g^x*h^y corresponding to the random nonce x and the random nonce y by using the commitment scheme, (iii) a hash value c=hash(g^x*h^y) by using the first proof information g^x*h^y, and (iv) (2_1)-st proof information x'=x+c*(said another ID data) and (2_2)-nd proof information y'=y+c*(said another secret key) by referring to said another ID data, said another secret key, the random nonce x, the random nonce y, and the hash value c, to thereby generate the proof information, and wherein, at the step of (b), the specific service providing server checks 7hetherr (1) a reference hash value hash(g^x'*h^y'/comm (said another ID data)^c generated by referring to the (2_1)-st proof information x' and the (2_2)-nd proof information y', the hash value c, and said another ID commitment comm(said another ID data) and (2) the hash value c correspond with each other, thus authenticating said another ID data.

In accordance with another aspect of the present disclosure, there is provided a method for managing a virtual common ID based on a blockchain network, including steps of: (a) on condition that (i) each of a first user ID to an n-th user ID corresponding to a user have been registered in each of a first service providing server to an n-th service providing server, (ii) a user data set including first ID data to n-th ID data, corresponding to a common ID data of the user, has been registered in the blockchain network, wherein the first ID data to the n-th ID data correspond to the first user ID to the n-th user ID, and (iii) each of a first ID commitment to an n-th ID commitment, each of which is generated by applying an operation of a commitment scheme on each of a first secret key and the first ID data to an n-th secret key and the n-th ID data corresponding to each of the first service providing server to the n-th service providing server, have been registered in the blockchain network, in response to acquiring a specific ID requesting transaction, corresponding to the user, including (i) another ID data, corresponding to the user, of another service providing server among the first service providing server to the n-th service providing server and (ii) proof information for proving ownership of said another ID data, a specific service providing server, among the first service providing server to the n-th service providing server, acquiring another ID commitment corresponding to said another ID data from the blockchain network by using said another ID data acquired from the specific ID requesting transaction; (b) the specific service providing server determining whether said another ID data is authenticated by referring to said another ID commitment acquired from the blockchain network and the proof information acquired from the specific ID requesting transaction; and (c) in response to said another ID data being authenticated, the specific service providing server (i) acquiring the user data set including said another ID data from the blockchain network by using said another ID data included in the specific ID requesting transaction, (ii) confirming a specific user ID corresponding to a specific ID data, among the first ID data to the n-th ID data, included in the user data set, and then (iii) transmitting the confirmed specific user ID to said another service providing server.

As one example, before the step of (a), the method further includes steps of: (a1) in response to acquiring a user ID generating request from a user device of the user, the specific service providing server (i) generating the specific user ID corresponding to the user, (ii) generating the specific ID data obtained by processing the specific user ID, and (iii) generating specific server trap information by using a specific secret key of the specific service providing server; and (a2) the specific service providing server transmitting the specific ID data and the specific server trap information to a certification-supporting server, to thereby instruct the certification-supporting server to (i) generate a specific ID commitment by applying the operation of the commitment scheme on the specific ID data and the specific server trap information, (ii) register the specific ID commitment in the blockchain network, (iii) register the specific ID data in the blockchain network, and thus (iv) allow the specific ID data to correspond to the user data set.

As one example, generators of the commitment scheme are represented as g and h, and said another ID commitment is represented as comm(said another ID data)=g^(said another ID data)*h^(another secret key), wherein said g^(said another ID data) represents g to the power of said another ID data, and wherein said h^(said another secret key) represents h to the power of said another secret key, and wherein, at the step of (a), in response to said another service providing server (i) generating a random nonce x and a random nonce y and (ii) generating and transmitting first proof information g^x*h^y corresponding to the random nonce x and the random nonce y by using the commitment scheme, the specific service providing server transmits a random nonce c to said another service providing server, and instructs said another service providing server to generate (2_1)-st proof information x'=x+c^(said another ID data) and (2_2)-nd proof information y'=y+c^(said another secret key) by referring to said another ID data, said another secret key, the random nonce x, the random nonce y, and the random nonce c, to thereby generate the proof information, and wherein, at the step of (b), the specific service providing server checks whether (1) a first reference value g^x*h^y*comm(said another ID data)^c generated by referring to the first proof information g^x*h^y and said another ID commitment comm(said another ID data) and (2) a second reference value $g\hat{\ }x' *h\hat{\ }y'$ generated by referring to the (2_1)-st proof information x' and the (2_2)-nd proof information y' correspond with each other, thus authenticating said another ID data.

As one example, generators of the commitment scheme are represented as g and h, and said another ID commitment is represented as comm(said another ID data)=$g\hat{\ }$(said another ID data)*$h\hat{\ }$(another secret key), wherein said $g\hat{\ }$(said another ID data) represents g to the power of said another ID data, and wherein said $h\hat{\ }$(said another secret key) represents h to the power of said another secret key, and wherein, at the step of (a), said another service providing server generates (i) a random nonce x and a random nonce y, (ii) first proof information $g\hat{\ }x*h\hat{\ }y$ corresponding to the random nonce x and the random nonce y by using the commitment scheme, (iii) a hash value c=hash($g\hat{\ }x*h\hat{\ }y$) by using the first proof information $g\hat{\ }x*h\hat{\ }y$, and (iv) (2_1)-st proof information x'=x+c*(said another ID data) and (2_2)-nd proof information y'=y+c*(said another secret key) by referring to said another ID data, said another secret key, the random nonce x, the random nonce y, and the hash value c, to thereby generate the proof information, and wherein, at the step of (b), the specific service providing server checks whether (1) a reference hash value hash($g\hat{\ }x'*h\hat{\ }y'$/comm (said another ID data)$\hat{\ }c$ generated by referring to the (2_1)-st proof information x' and the (2_2)-nd proof information y', the hash value c, and said another ID commitment comm(said another ID data) and (2) the hash value c correspond with each other, thus authenticating said another ID data.

In accordance with yet another aspect of the present disclosure there is provided a specific service providing server, among a first service providing server to an n-th service providing server, for managing a virtual common ID based on a blockchain network, including: at least one memory that stores instructions; and at least one processor configured to execute the instructions to perform processes of: (I) on condition that (i) (i-1) each of a first user ID to an n-th user ID corresponding to a user and (i-2) each of a first ID data to an n-th ID data corresponding to each of the first user ID to the n-th user ID have been registered in each of the first service providing server to the n-th service providing server, (ii) a user data set including the first ID data to the n-th ID data, corresponding to a common ID data of the user, has been registered in the blockchain network, and (iii) each of a first ID commitment to an n-th ID commitment, each of which is generated by applying an operation of a commitment scheme on each of a first secret key and the first ID data to an n-th secret key and the n-th ID data corresponding to each of the first service providing server to the n-th service providing server, have been registered in the blockchain network, in response to acquiring a specific ID requesting transaction, corresponding to the user, including (i) another ID data, corresponding to the user, of another service providing server among the first service providing server to the n-th service providing server, (ii) the user data set acquired from the blockchain network by using said another ID data through said another service providing server, and (iii) proof information for proving ownership of said another ID data, acquiring another ID commitment corresponding to said another ID data from the blockchain network by using said another ID data acquired from the specific ID requesting transaction; (II) determining whether said another ID data is authenticated by referring to said another ID commitment acquired from the blockchain network and the proof information acquired from the specific ID requesting transaction; and (III) in response to said another ID data being authenticated, confirming a specific user ID corresponding to a specific ID data, among the first ID data to the n-th ID data, included in the user data set, and then transmitting the confirmed specific user ID to said another service providing server.

As one example, before the process of (I), the processor further performs processes of: (I-1) in response acquiring a user ID generating request from a user device of the user, (i) generating the specific user ID corresponding to the user, (ii) generating the specific ID data obtained by processing the specific user ID, and (iii) generating specific server trap information by using a specific secret key of the specific service providing server; and (I-2) transmitting the specific ID data and the specific server trap information to a certification-supporting server, to thereby instruct the certification-supporting server to (i) generate a specific ID commitment by applying the operation of the commitment scheme on the specific ID data and the specific server trap information, (ii) register the specific ID commitment in the blockchain network, (iii) register the specific ID data in the blockchain network, and thus (iv) allow the specific ID data to correspond to the user data set.

As one example, generators of the commitment scheme are represented as g and h, and said another ID commitment is represented as comm(another user ID)=$g\hat{\ }$(said another ID data)*$h\hat{\ }$(another secret key), wherein said $g\hat{\ }$(said another ID data) represents said g to the power of said another ID data, and wherein said $h\hat{\ }$(said another secret key) represents said h to the power of said another secret key, and wherein, at the process of (I), in response to said another service providing server (i) generating a random nonce x and a random nonce y and (ii) generating and transmitting first proof information $g\hat{\ }x*h\hat{\ }y$ corresponding to the random nonce x and the random nonce y by using the commitment scheme, the processor transmits a random nonce c to said another service providing server, and instructs said another service providing server to generate (2_1)-st proof information x'=x+c*(said another ID data) and (2_2)-nd proof information y'=y+c*(said another secret key) by referring to said another ID data, said another secret key, the random nonce x, the random nonce y, and the random nonce c, to thereby generate the proof information, and wherein, at the process of (II), the processor checks whether (1) a first reference value $g\hat{\ }x*h\hat{\ }y*$comm(said another ID data)$\hat{\ }c$ generated by referring to the first proof information $g\hat{\ }x*h\hat{\ }y$ and said another ID commitment comm(said another ID data) and (2) a second reference value $g\hat{\ }x'*h\hat{\ }y'$ generated by referring to the (2_1)-st proof information x' and the (2_2)-nd proof information y' correspond with each other, thus authenticating said another ID data.

As one example, generators of the commitment scheme are represented as g and h, and said another ID commitment is represented as comm(said another ID data)=$g\hat{\ }$(said another ID data)*$h\hat{\ }$(another secret key), wherein said $g\hat{\ }$(said another ID data) represents g to the power of said another ID data and wherein said $h\hat{\ }$(said another secret key) represents h to the power of said another secret key, and wherein, at the process of (I), said another service providing server generates (i) a random nonce x and a random nonce y, (ii) first proof information $g\hat{\ }x*h\hat{\ }y$ corresponding to the random nonce x and the random nonce y by using the commitment scheme, (iii) a hash value c=hash($g\hat{\ }x*h\hat{\ }y$) by using the first proof information $g\hat{\ }x*h\hat{\ }y$, and (iv) (2_1)-st proof information x'=x+c*(said another ID data) and (2_2)-nd proof information y'=y+c*(said another secret key) by referring to said another ID data, said another secret key, the random nonce x, the random nonce y, and the hash value c, to thereby generate the proof information, and wherein, at the process of (II), the processor checks whether (1) a reference hash value hash(g^x'*h^y'/comm(said another ID data)^c generated by referring to the (2_1)-st proof information x' and the (2_2)-nd proof information y', the hash value c, and said another ID commitment comm(said another ID data) and (2) the hash value c correspond with each other, thus authenticating said another ID data.

In accordance with still yet another aspect of the present disclosure there is provided a specific service providing server, among a first service providing server to an n-th service providing server, for managing a virtual common ID based on a blockchain network, including: at least one memory that stores instructions; and at least one processor configured to execute the instructions to perform processes of: (I) on condition that (i) each of a first user ID to an n-th user ID corresponding to a user have been registered in each of the first service providing server to the n-th service providing server, (ii) a user data set including first ID data to n-th ID data, corresponding to a common ID data of the user, has been registered in the blockchain network, wherein the first ID data to the n-th ID data correspond to the first user ID to the n-th user ID, and (iii) each of a first ID commitment to an n-th ID commitment, each of which is generated by applying an operation of a commitment scheme on each of a first secret key and the first ID data to an n-th secret key and the n-th ID data corresponding to each of the first service providing server to the n-th service providing server, have been registered in the blockchain network, in response to acquiring a specific ID requesting transaction, corresponding to the user, including (i) another ID data, corresponding to the user, of another service providing server among the first service providing server to the n-th service providing server and (ii) proof information for proving ownership of said another ID data, acquiring another ID commitment corresponding to said another ID data from the blockchain network by using said another ID data acquired from the specific ID requesting transaction; (II) determining whether said another ID data is authenticated by referring to said another ID commitment acquired from the blockchain network and the proof information acquired from the specific ID requesting transaction; and (III) in response to said another ID data being authenticated, (i) acquiring the user data set including said another ID data from the blockchain network by using said another ID data included in the specific ID requesting transaction, (ii) confirming a specific user ID corresponding to a specific ID data, among the first ID data to the n-th ID data, included in the user data set, and then (iii) transmitting the confirmed specific user ID to said another service providing server.

As an example, before the process of (I), the processor further performs processes of: (I-1) in response to acquiring a user ID generating request from a user device of the user, (i) generating the specific user ID corresponding to the user, (ii) generating the specific ID data obtained by processing the specific user ID, and (iii) generating specific server trap information by using a specific secret key of the specific service providing server; and (I-2) transmitting the specific ID data and the specific server trap information to a certification-supporting server, to thereby instruct the certification-supporting server to (i) generate a specific ID commitment by applying the operation of the commitment scheme on the specific ID data and the specific server trap information, (ii) register the specific ID commitment in the blockchain network, (iii) register the specific ID data in the blockchain network, and thus (iv) allow the specific ID data to correspond to the user data set.

As one example, generators of the commitment scheme are represented as g and h, and said another ID commitment is represented as comm(said another ID data)=g^(said another ID data)*h^(another secret key), wherein said g^(said another ID data) represents g to the power of said another ID data, and wherein said h^(said another secret key) represents h to the power of said another secret key, and wherein, at the process of (I), in response to said another service providing server (i) generating a random nonce x and a random nonce y and (ii) generating and transmitting first proof information g^x*h^y corresponding to the random nonce x and the random nonce y by using the commitment scheme, the processor transmits a random nonce c to said another service providing server, and instructs said another service providing server to generate (2_1)-st proof information x'=x+c^(said another ID data) and (2_2)-nd proof information y'=y+c^(said another secret key) by referring to said another ID data, said another secret key, the random nonce x, the random nonce y, and the random nonce c, to thereby generate the proof information, and wherein, at the process of (II), the processor checks whether (1) a first reference value g^x*h^y*comm(said another ID data)^c generated by referring to the first proof information g^x*h^y and said another ID commitment comm(said another ID data) and (2) a second reference value g^x' *h^y' generated by referring to the (2_1)-st proof information x' and the (2_2)-nd proof information y' correspond with each other, thus authenticating said another ID data.

As one example, generators of the commitment scheme are represented as g and h, and said another ID commitment is represented as comm(said another ID data)=g^(said another ID data)*h^(another secret key), wherein said g^(said another ID data) represents g to the power of said another ID data, and wherein said h^(said another secret key) represents h to the power of said another secret key, and wherein, at the process of (I), said another service providing server generates (i) a random nonce x and a random nonce y, (ii) first proof information g^x*h^y corresponding to the random nonce x and the random nonce y by using the commitment scheme, (iii) a hash value c=hash(g^x*h^y) by using the first proof information g^x*h^y, and (iv) (2_1)-st proof information x'=x+c*(said another ID data) and (2_2)-nd proof information y'=y+c*(said another secret key) by referring to said another ID data, said another secret key, the random nonce x, the random nonce y, and the hash value c, to thereby generate the proof information, and wherein, at the process of (II), the processor checks whether (1) a reference hash value hash(g^x'*h^y'/comm(said another ID data)^c generated by referring to the (2_1)-st proof information x' and the (2_2)-nd proof information y', the hash value c, and said another ID commitment comm(said another ID data) and (2) the hash value c correspond with each other, thus authenticating said another ID data.

In addition, recordable media that are readable by a computer for storing a computer program to execute the method of the present disclosure is further provided.

DETAILED DESCRIPTION OF THE PREFERRED

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached diagrams will be explained in detail as shown below.

Figure 1:
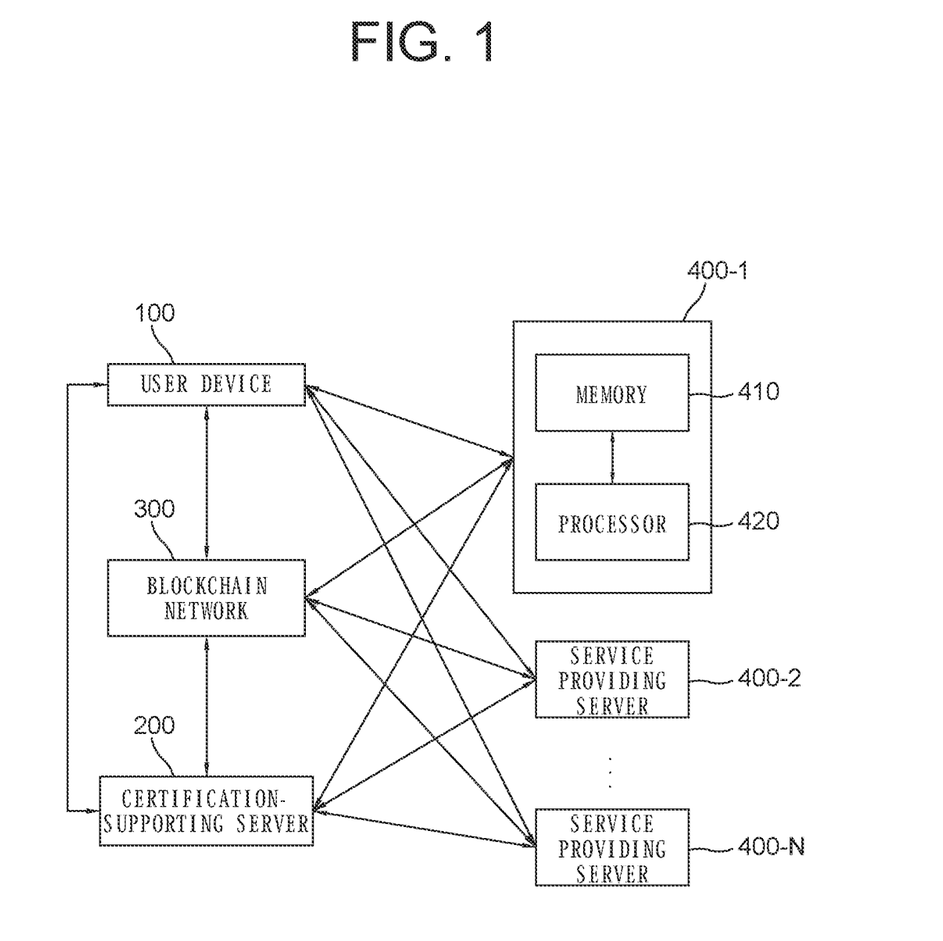
FIG. 1 is a drawing schematically illustrating a system for managing a virtual common ID, i.e., providing a service of the virtual common ID, based on a blockchain network in accordance with one example embodiment of the present disclosure.

FIG. 1 is a drawing schematically illustrating a system for managing a virtual common ID, i.e., providing a service of the virtual common ID, based on a blockchain network in accordance with one example embodiment of the present disclosure. Referring to FIG. 1, the system may include a user device 100, a certification-supporting server 200, a blockchain network 300, and service providing servers 400-1 to 400-N.

First, the user device 100 may be a device for displaying information served to a user and for managing user identity information related to authenticating the user. It may include a PC (Personal Computer), a mobile computer, a PDA/EDA, a mobile phone, a smart phone, a tablet, etc. However, the user device 100 is not limited thereto, and may include any communication device like a digital camera, a personal navigation device, and a mobile gaming device, etc. capable of wired and wireless communication.

Next, the certification-supporting server 200 may generate ID commitments related to ID data of the user, and register the ID commitments and the ID data in the blockchain network 300. Herein, the certification-supporting server 200 may be a server corresponding to at least one of nodes in the blockchain network 300, another server capable of managing the nodes of the blockchain network 300, or a transaction server.

Next, the blockchain network 300 performs distributed processing of data, i.e., connecting blocks of the data in a chain-like manner and recording them in a distributed ledger, and saves the ID commitments and a user data set including the ID data in the distributed ledger. Herein, the blockchain network 300 may be configured as a private blockchain network and/or a public blockchain network.

Next, since each of the service providing servers 400-1 to 400-N may provide services to the user such as registering an user ID and saving the ID data corresponding to the user ID, it may include a memory 410 for storing instructions for managing the virtual common ID based on the blockchain network 300 and a processor 420 for performing processes of managing the virtual common ID based on the blockchain network 300 according to the instructions stored in the memory 410.

Specifically, each of the service providing servers 400-1 to 400-N may typically achieve a desired system performance by using combinations of at least one computing device such as a computer processor, a memory, a storage, an input device, an output device, or any other conventional computing components, at least one electronic communication device such as a router or a switch, at least one electronic information storage system such as a network-attached storage (NAS) device or a storage area network (SAN), and at least one computer software, i.e., any instructions that allow the computing device to function in a specific manner.

The communication part of such devices may transmit requests to and receive responses from other linked devices. As one example, such requests and responses may be carried out by the same TCP (transmission control protocol) session, but the scope of the present disclosure is not limited thereto. For example, they could be transmitted and received as UDP (user datagram protocol) datagrams.

Also, the processors of such devices may include hardware configuration of MPU (Micro Processing Unit) or CPU (Central Processing Unit), cache memory, data bus, etc. Additionally, any OS (operating system) and software configuration of applications that achieve specific purposes may be further included.

Figure 2:
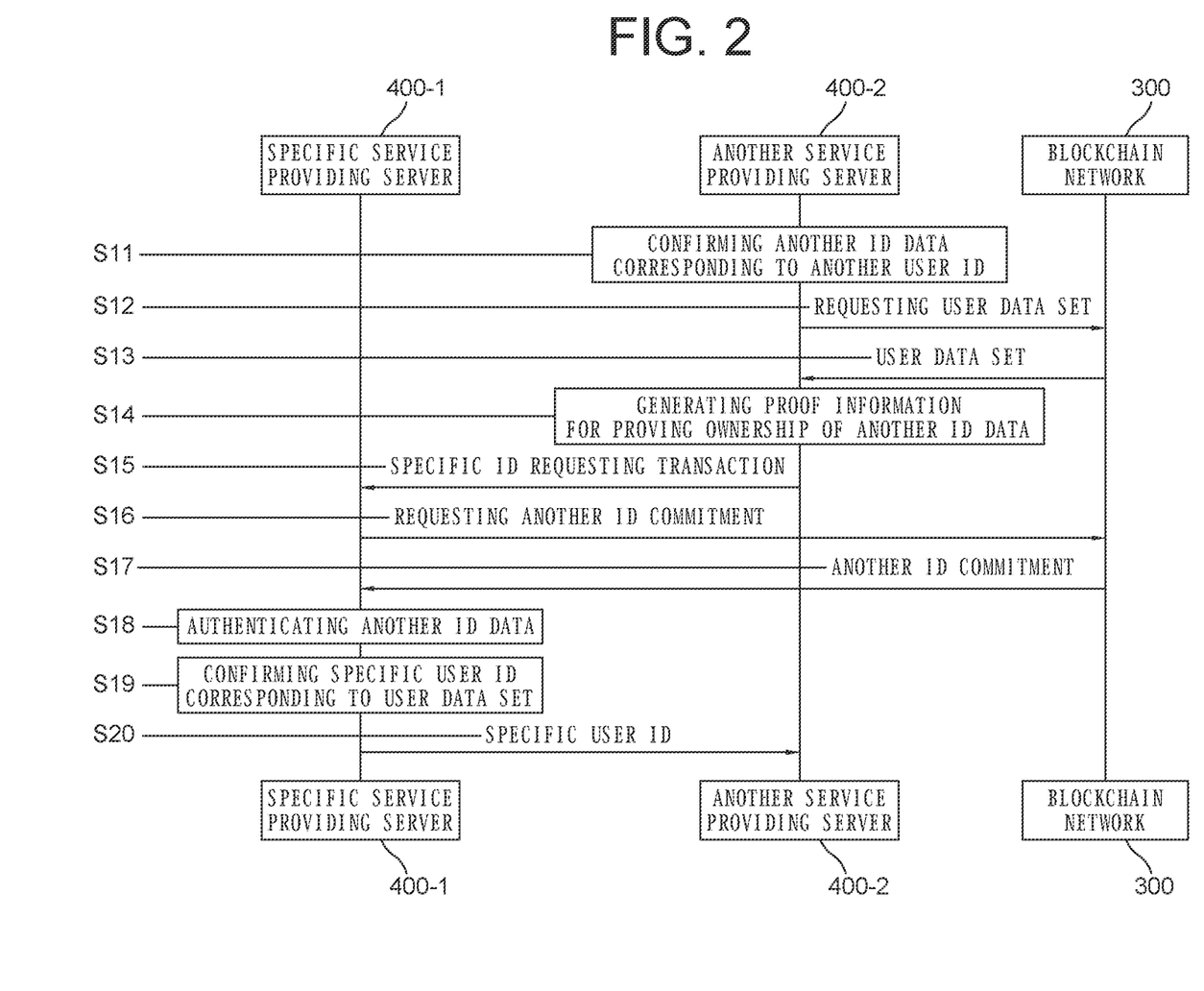
FIG. 2 is a drawing schematically illustrating a method for managing the virtual common ID based on the blockchain network in accordance with one example embodiment of the present disclosure.

A method of managing the virtual common ID based on the blockchain network 300 in accordance with one example embodiment of the present disclosure will be described by referring to FIG. 2 as follows.

First, (i) (i-1) each of a first user ID to an n-th user ID corresponding to the user and (i-2) each of a first ID data to an n-th ID data corresponding to each of the first user ID to the n-th user ID may have been registered in each of a first service providing server to an n-th service providing server, (ii) the user data set including the first ID data to the n-th ID data, corresponding to a common ID data of the user, may have been registered in the blockchain network 300, and (iii) each of a first ID commitment to an n-th ID commitment, each of which is generated by applying an operation of a commitment scheme on each of a first secret key and the first ID data to an n-th secret key and the n-th ID data corresponding to each of the first service providing server to the n-th service providing server, may have been registered in the blockchain network 300.

That is, in response to acquiring a user ID generating request from the user device 100 of the user, a specific service providing server, among the first service providing server to the n-th service providing server, may generate a specific user ID corresponding to the user. Herein, the specific user ID may be generated by using the user identity information and a secret key of the specific service providing server, and the user identity information may include any information related to the user such as a name, an age, an address, a phone number, a gender, a social security number, an occupation, an ID, permission information, etc., and the secret key is a secret value only known to the user.

Additionally, the specific service providing server may generate a specific ID data by processing the specific user ID. Herein, the specific ID data may be acquired by processing the specific user ID through a pair of a private key and a public key, a hash operation, and a random number binding, etc., but it is not limited thereto and may be acquired by hiding the specific user ID (so as not to be disclosed).

Then, the specific service providing server may use a specific secret key of the specific service providing server, to thereby generate specific server trap information. For example, if generators of the commitment scheme are g and h, the specific server trap information may be generated by h^(the specific secret key). Herein, said h^(the specific secret key) represents said h to the power of the specific secret key.

Further, the specific service providing server may transmit the specific ID data and the specific server trap information to the certification-supporting server 200, to thereby instruct the certification-supporting server 200 to (i) generate a specific ID commitment by applying the operation of the commitment scheme on the specific ID data and the specific server trap information, (ii) register the specific ID commitment in the blockchain network 300, (iii) register the specific ID data in the blockchain network 300, and thus (iv) allow the specific ID data to correspond to the user data set. Herein, the user data set may include each of corresponding ID data generated by each of the corresponding service providing servers 400-1 to 400-N. In addition, the user data set may include each of transactions related to each of the ID data and may be managed as a virtual integrated ID by using each of transaction chains.

Herein, if the generators of the commitment scheme are represented as g and h, the specific ID commitment is represented as comm(the specific user ID)=g^(the specific ID data)*h^(the specific secret key). Herein, said comm(the specific user ID) represents a function "comm" of "the specific user ID" such as f(x), i.e., a function "f" of "x", said g^(the specific ID data) represents said g to the power of the specific ID data, and said h^(the specific secret key) represents said h to the power of the specific secret key.

On condition as above, another service providing server 400-2, among the first service providing server to the n-th service providing server, may confirm another ID data corresponding to another user ID, at a step of S11, and request blockchain network 300 for the user data set by using said another ID data, at a step of S12. For example, while the user is using a service provided by said another service providing server 400-2 by using said another user ID, if a service provided by the specific service providing server 400-1 is requested to said another service providing service 400-2, said another service providing server 400-2 may confirm said another ID data registered in itself by using said another user ID of the user and transmit a user data set requesting transaction including said another ID data to the blockchain network 300.

Then, the blockchain network 300 may acquire the user data set including said another ID data among data sets registered in the distributed ledger by using said another ID data and transmit the user data set to said another service providing server 400-2, at a step of S13.

Thereafter, in response to acquiring the user data set from the blockchain network 300, said another service providing server 400-2 may generate proof information for proving ownership of said another ID data, at a step of S14.

Figure 3:
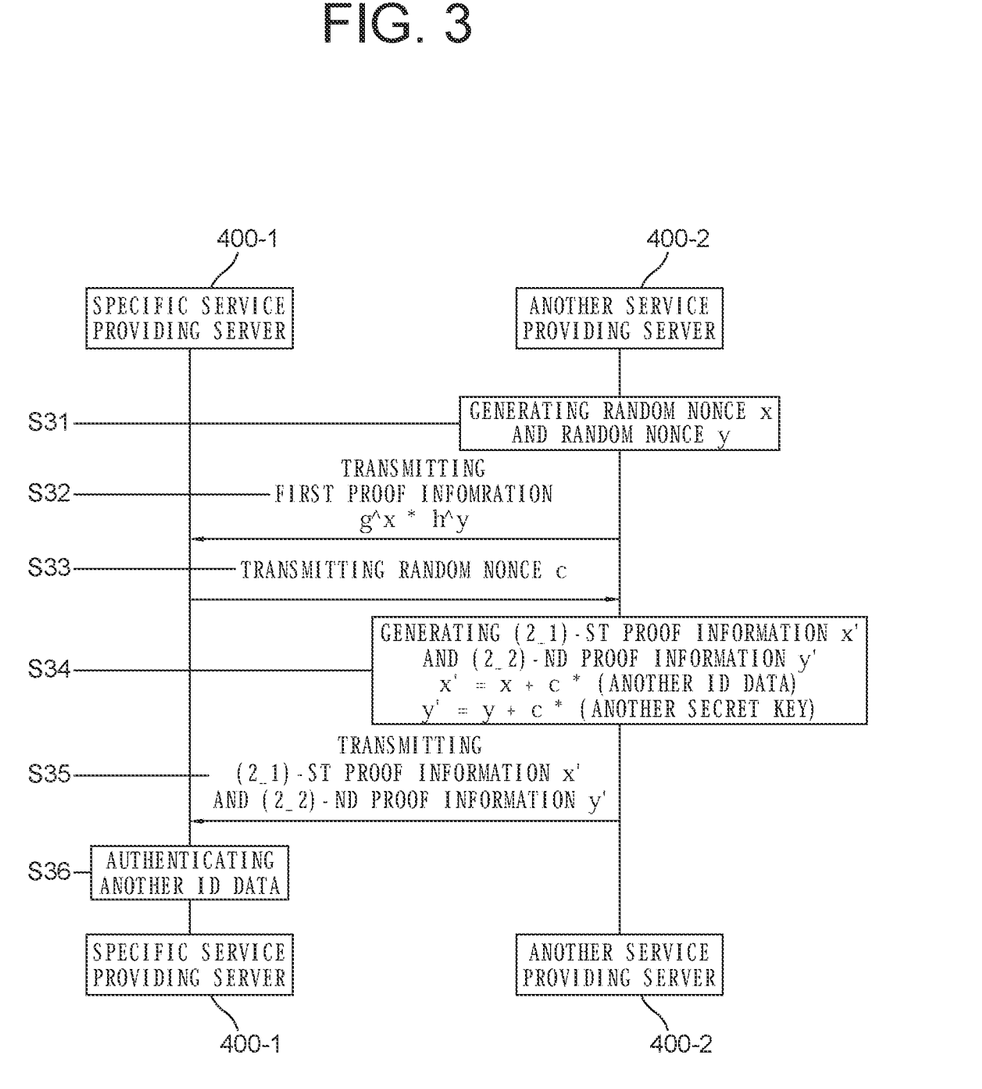
FIG. 3 is a drawing schematically illustrating a process of authenticating ID data according to the method for managing the virtual common ID based on the blockchain network in accordance with one example embodiment of the present disclosure.

Herein, by referring to FIG. 3, said another service providing server 400-2 may generate a random nonce x and a random nonce y, at a step of S31. Further, said another service providing server 400-2 may generate first proof information g^x*h^y corresponding to the random nonce x and the random nonce y by using the commitment scheme and transmit the first proof information to the specific service providing server 400-1, at a step of S32. Then, the specific service providing server 400-1 may (i) generate the random nonce c and transmit it to said another service providing server 400-2, at a step of S33, and said another service providing server 400-2 may generate (2_1)-st proof information x'=x+c*(said another ID data) and (2_2)-nd proof information y'=y+c*(said another secret key) by referring to said another ID data, said another secret key, the random nonce x, the random nonce y, and the random nonce c, at a step of S34. Furthermore, said another service providing server 400-2 may transmit the generated (2_1)-st proof information x' and the generated (2_2)-nd proof information y' to the specific service providing server 400-1, at a step of S25.

Figure 4:
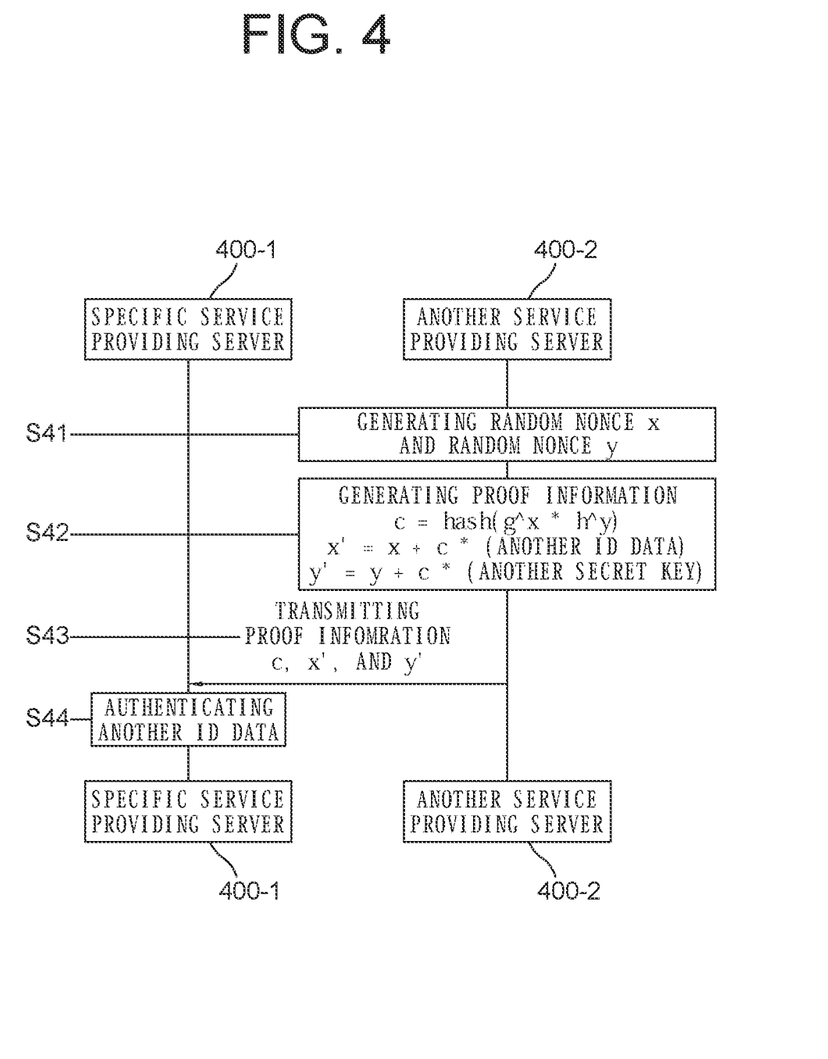
FIG. 4 is a drawing schematically illustrating another process of authenticating the ID data according to the method for managing the virtual common ID based on the blockchain network in accordance with one example embodiment of the present disclosure.

Contrary to above, by referring to FIG. 4, said another service providing server 400-2 may generate the random x and the random nonce y, at a step of S41. Further, said another service providing server 400-2 may generate the first proof information g^x*h^y corresponding to the random nonce x and the random nonce y by using the commitment scheme. Next, said another service providing server 400-2 may (i) generate a hash value c=hash(g^x*h^y) by using the first proof information g^x*h^y, and then (ii) generate the (2_1)-st proof information x'=x+c*(said another ID data) and the (2_2)-nd proof information y'=y+c*(said another secret key) by referring to said another ID data, said another secret key, the random nonce x, the random nonce y, and the hash value c, at a step of S42. Furthermore, said another service providing server 400-2 may transmit the generated (2_1)-st proof information x', the generated (2_2)-nd proof information y', and the hash value c to the specific service providing server 400-1, at a step of S43.

Referring back to FIG. 2, said another service providing server 400-2 may transmit a specific ID requesting transaction corresponding to the user, which includes said another ID data, the user data set, and the proof information for proving ownership of said another ID data corresponding to the user, to the specific service providing server 400-1, at a step of S15.

Then, (i) the specific service providing server 400-1 may request the blockchain network 300 for said another ID commitment corresponding to said another ID data, at a step of S16, by using said another ID data acquired from the specific ID requesting transaction, and (ii) the blockchain network 300 may confirm said another ID commitment registered in the distributed ledger using said another ID data, and transmit said another ID commitment to the specific service providing server 400-1, at a step of S17.

Next, the specific service providing server 400-1 may authenticate said another ID data, at a step of S18, by referring to said another ID commitment acquired from the blockchain network 300 and the proof information included in the specific ID requesting transaction acquired from said another service providing server 400-2.

For example, by referring to FIG. 3, the specific service providing server 400-1 checks whether (1) a first reference value $g\hat{}x*h\hat{}y*comm(\text{said another ID data})\hat{}c$ generated by referring to the first proof information $g\hat{}x*h\hat{}y$ and said another ID commitment comm(said another ID data) and (2) a second reference value $g\hat{}x'*h\hat{}y'$ generated by referring to the (2_1)-st proof information x' and the (2_2)-nd proof information y' correspond with each other, thus authenticating said another ID data.

That is, the second reference value $g\hat{}x'*h\hat{}y'$ is represented as $g\hat{}(x+c*(\text{said another ID data}))*h\hat{}(y+c*(\text{said another secret key}))$. Also, $g\hat{}(x+c*(\text{said another ID data}))*h\hat{}(y+c*(\text{said another secret key}))$ is represented as $g\hat{}x*h\hat{}y*g\hat{}(c*(\text{said another ID data}))*h\hat{}(c*(\text{said another secret key}))$. Additionally, $g\hat{}x*h\hat{}y*g\hat{}(c*(\text{said another ID data}))*h\hat{}(c*(\text{said another secret key}))$ is again represented as $g\hat{}x*h\hat{}y*(g\hat{}(\text{said another ID data}))*h\hat{}(\text{said another secret key}))\hat{}c$, and then $g\hat{}x*h\hat{}y*(g\hat{}(\text{said another ID data}))*h\hat{}(\text{said another secret key}))\hat{}c$ is represented as the first reference value $g\hat{}x*h\hat{}y*comm(\text{said another ID data})\hat{}c$.

Unlike above, by referring to FIG. 4, the specific service providing server 400-1 may check whether (1) a reference hash value, i.e., $hash(g\hat{}x'*h\hat{}y'/comm(\text{said another ID data})\hat{}c)$, generated by referring to the (2_1)-st proof information x', the (2_2)-nd proof information y', the hash value c, and said another ID commitment comm(said another ID data) and (2) the hash value c correspond with each other, thus authenticating said another ID data.

That is the reference hash value, i.e., $hash((g\hat{}x'*h\hat{}y')/(comm(\text{said another ID data})\hat{}c))$, is represented as $hash((g\hat{}(x+c*(\text{said another ID data}))*h\hat{}(y+c*(\text{said another secret key})))/(comm(\text{said another ID data})\hat{}c))$. And then $hash((g\hat{}(x+c*(\text{said another ID data}))*h\hat{}(y+c*(\text{said another secret key})))/(comm(\text{said another ID data})\hat{}c))$ is represented as $hash((g\hat{}x*h\hat{}y*g\hat{}(c*\text{said another ID data})*h\hat{}(c*\text{said another secret key}))/(comm(\text{said another ID data})\hat{}c))$. Also, $hash((g\hat{}x*h\hat{}y*g\hat{}(c*\text{said another ID data})*h\hat{}(c*\text{said another secret key}))/(comm(\text{said another ID data})\hat{}c))$ may be $hash(g\hat{}x*h\hat{}y)$, which is equal to the hash value c.

That is, according to an example embodiment of the present disclosure, it is possible to bind said another ID data so that it becomes unalterable by said another service providing server 400-2 without needing to disclose said another ID data and said another secret key, to hide said another ID data and said secret key during authentication without disclosing the said another ID data and said secret key, and to prohibit an estimation of said another ID through the proof information by generating the proof information using random nonces.

Referring back to FIG. 2, in response to said another ID data being authenticated in the same way as mentioned above, the specific service providing server 400-1 may confirm the specific user ID corresponding to the specific ID data, among the first ID data to the n-th ID data, included in the user data set, at a step of S19, and then transmit the confirmed specific user ID to said another service providing server 400-2, at a step of S20.

Accordingly, said another service providing server 400-2 may allow the specific service provided by the specific service providing server 400-1 to be accessible for the user by using the specific user ID corresponding to the user.

Meanwhile, another method of managing the virtual common ID based on the blockchain network 300 in accordance with one example embodiment of the present disclosure will be described by referring to FIG. 5 as follows. In the description below, the part easily deducible from the explanation of FIG. 2 will be omitted.

Said another service providing server 400-2 may confirm said another ID data corresponding to said another user ID, at a step of S51, and generate proof information of said another ID data, at a step of S52.

Herein, by referring to FIG. 3, said another service providing server 400-2 may generate the random nonce x and the random nonce y, at a step of S31. Further, said another service providing server 400-2 may generate the first proof information $g\hat{}x*h\hat{}y$ corresponding to the random nonce x and the random nonce y by using the commitment scheme and then transmit the first proof information to the specific service providing server 400-1, at a step of S32. Thereafter, the specific service providing server 400-1 may (i) generate the random nonce c and transmit it to said another service providing server 400-2, at a step of S33, and then said another service providing server 400-2 may generate the (2_1)-st proof information $x'=x+c*(\text{said another ID data})$ and the (2_2)-nd proof information $y'=y+c*(\text{said another secret key})$ by referring to said another ID data, said another secret key, the random nonce x, the random nonce y, and the random nonce c, at a step of S34. Furthermore, said another service providing server 400-2 may transmit the generated (2_1)-st proof information x' and the generated (2_2)-nd proof information y' to the specific service providing server 400-1, at a step of S35.

Contrary to above, by referring to FIG. 4, said another service providing server 400-2 may generate the random x and the random nonce y, at a step of S41. Further, said another service providing server 400-2 may generate the first proof information $g\hat{}x*h\hat{}y$ corresponding to the random nonce x and the random nonce y by using the commitment scheme. Next, said another service providing server 400-2 may (i) generate a hash value $c=hash(g\hat{}x*h\hat{}y)$ by using the first proof information $g\hat{}x*h\hat{}y$, and then (ii) generate the (2_1)-st proof information $x'=x+c*(\text{said another ID data})$ and the (2_2)-nd proof information $y'=y+c*(\text{said another secret key})$ by referring to said another ID data, said another secret key, the random nonce x, the random nonce y, and the hash value c, at a step of S42. Furthermore, said another service providing server 400-2 may transmit the generated (2_1)-st proof information x', the generated (2_2)-nd proof information y', and the hash value c to the specific service providing server 400-1, at a step of S43.

Referring back to FIG. 5, said another service providing server 400-2 may transmit the specific ID requesting transaction corresponding to the user, which includes said another ID data, and the proof information for proving ownership of said another ID data corresponding to the user, to the specific service providing server 400-1, at a step of S53.

Then, (i) the specific service providing server 400-1 may request the blockchain network 300 for said another ID commitment corresponding to said ID data, at a step of S54, by using said another ID data acquired from the specific ID requesting transaction, and (ii) the blockchain network 300 may confirm said another ID commitment registered in the distributed ledger using said another ID data, and then transmit said another ID commitment to the specific service providing server 400-1, at a step of S55.

Next, the specific service providing server 400-1 may authenticate said another ID data, at a step of S56, by referring to said another ID commitment acquired from the blockchain network 300 and the proof information included in the specific ID requesting transaction acquired from said another service providing server 400-2.

For example, by referring to FIG. 3, the specific service providing server 400-1 may check whether (1) the first reference value $g^x*h^y*comm(\text{said another ID data})^c$ generated by referring to the first proof information $g^x*h^y$ and said another ID commitment $comm(\text{said another ID data})$ and (2) the second reference value $g^{x'}*h^{y'}$ generated by referring to the (2_1)-st proof information x' and the (2_2)-nd proof information y' correspond with each other, thus authenticating said another ID data.

That is, the second reference value $g^{x'}*h^{y'}$ is represented as $g^{(x+c*(\text{said another ID data}))}*h^{(y+c*(\text{said another secret key}))}$. Also, $g^{(x+c*(\text{said another ID data}))}*h^{(y+c*(\text{said another secret key}))}$ is represented as $g^x*h^y*g^{(c*(\text{said another ID data}))}*h^{(c*(\text{said another secret key}))}$. Additionally, $g^x*h^y*g^{(c*(\text{said another ID data}))}*h^{(c*(\text{said another secret key}))}$ is again represented as $g^x*h^y*(g^{(\text{said another ID data})})*h^{(\text{said another secret key})})^c$, and then $g^x*h^y*(g^{(\text{said another ID data})}*h^{(\text{said another secret key})})^c$ is represented as the first reference value $g^x*h^y*comm(\text{said another ID data})^c$.

Unlike above, by referring to FIG. 4, the specific service providing server 400-1 may check whether (1) the reference hash value $hash(g^{x'}*h^{y'}/comm(\text{said another ID data})^c$ generated by referring to the (2_1)-st proof information x', the (2_2)-nd proof information y', the hash value c, and said another ID commitment $comm(\text{said another ID data})$ and (2) the hash value c correspond with each other, thus authenticating said another ID data.

That is the reference hash value, i.e., $hash((g^{x'}*h^{y'})/(comm(\text{said another ID data})^c))$, is represented as $hash((g^{(x+c*(\text{said another ID data}))}*h^{(y+c*(\text{said another secret key}))})/(comm(\text{said another ID data})^c))$. And then $hash((g^{(x+c*(\text{said another ID data}))}*h^{(y+c*(\text{said another secret key}))})/(comm(\text{said another ID data})^c))$ is represented as $hash((g^x*h^y*g^{(c*\text{said another ID data})}*h^{(c*\text{said another secret key})})/(comm(\text{said another ID data})^c))$. Also, hash $((g^x*h^y*g^{(c*\text{said another ID data})}*h^{(c*\text{said another secret key})})/(comm(\text{said another ID data})^c))$ is hash $(g^x*h^y)$, therefore the hash value c.

Figure 5:
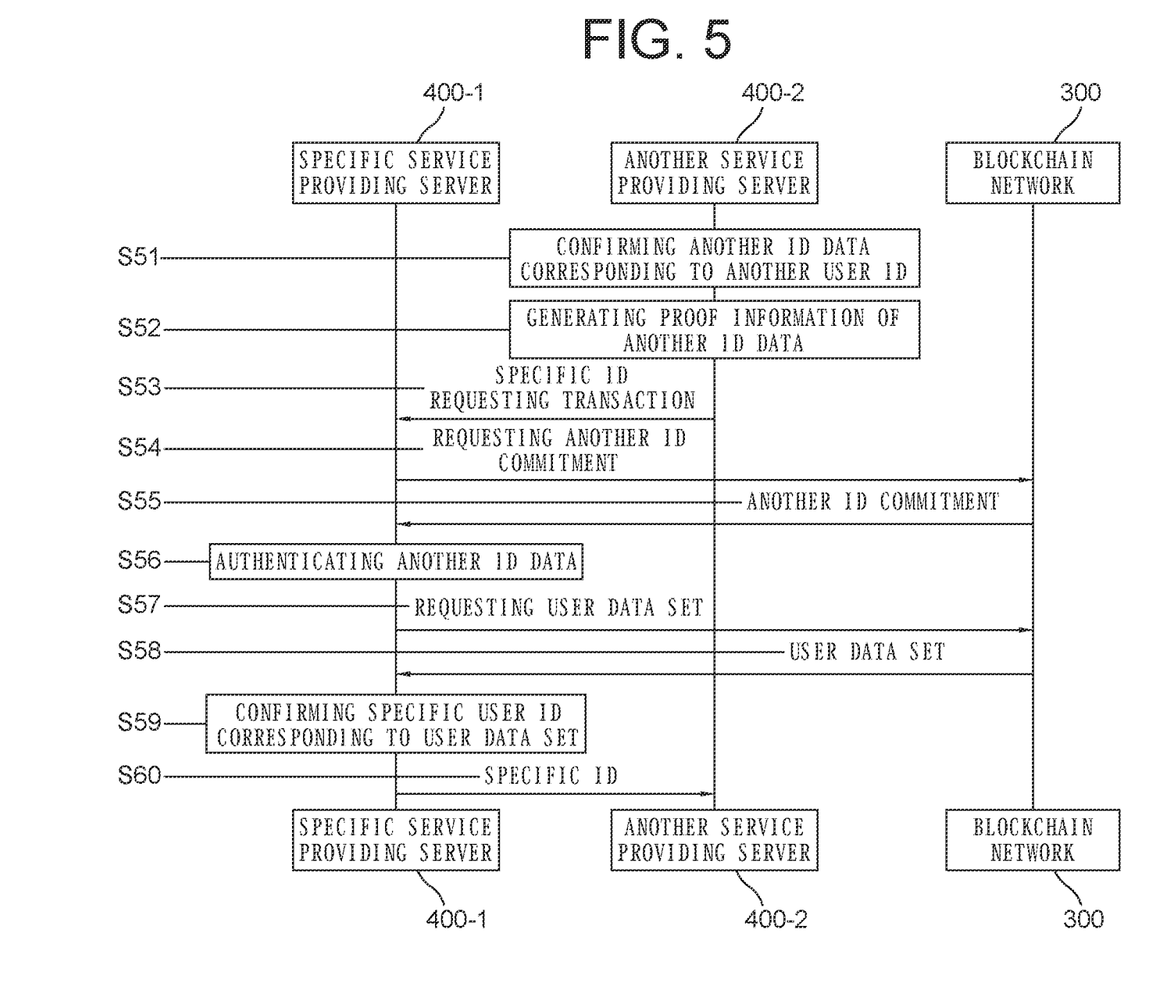
FIG. 5 is a drawing schematically illustrating the method for managing the virtual common ID based on the blockchain network in accordance with another example embodiment of the present disclosure.

Referring to FIG. 5, in response to said another ID data being authenticated according to the above method, the specific service providing server 400-1 may transmit the user data set requesting transaction including said another ID data to the blockchain network 300, at a step of S57.

Then, the blockchain network 300 may acquire the user data set including said another ID data among the data sets registered in the distributed ledger by using said another ID data and transmit the user data set to the specific service providing server 400-1, at a step of 358.

Thereafter, the specific service providing server 400-1 may confirm the specific user ID corresponding to the specific ID data, among the first ID data to the n-th ID data, included in the user data set, at a step of S59, and then transmit the confirmed specific user ID to said another service providing server 400-2, at a step of S60.

Accordingly, said another service providing server 400-2 may allow the specific service provided by the specific service providing server 400-1 to be accessible for the user by using the specific user ID corresponding to the user.

The present invention has an effect of relating pieces of information among service providers without needing to use association information even though different IDs are used for the different service providers.

The present invention has another effect of relating the pieces of information among the service providers while preventing a prediction of each of user IDs provided by each of the service providers.

The present invention has still another effect of integrating each of IDs generated for each of the service providers with each of IDs generated for each of other service providers without using a common ID.

The present invention has still yet another effect of preventing a disclosure of the IDs generated for each of the service providers to an unauthorized entity using other disclosed user information.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Program commands may include not only a machine language code made by a complier but also a high level code that can be used by an interpreter etc., which is executed by a computer. Program commands may include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for managing a virtual common ID based on a blockchain network, comprising steps of:
   (a) on condition that (i) each of a first user ID generated for a user by a first service providing server to an n-th user ID generated for the user by an n-th service providing server and each of a first ID data to an n-th ID data corresponding to each of the first user ID to the n-th user ID have been registered in each of a first service providing server to an n-th service providing server, wherein the first user ID to the n-th user ID are different user IDs, wherein the first user ID to the n-th user ID correspond to the user, and wherein the first service providing server to the n-th service providing server provide different services, (ii) a user data set including the first ID data to the n-th ID data, corresponding to a common ID data relating to the virtual common ID of the user, has been registered in the blockchain network, and (iii) each of a first ID commitment to an n-th ID commitment, each of which is generated by applying an operation of a commitment scheme on each of a first secret key and the first ID data to an n-th secret key and the n-th ID data corresponding to each of the first service providing server to the n-th service providing server, have been registered in the blockchain network, in response to acquiring, from another service providing server among the first service providing server to the n-th service providing server, a specific ID requesting transaction, corresponding to the user, including (1) another ID data corresponding to another user ID of the user, (2) the user data set acquired from the blockchain network by using said another ID data a said another service providing server, and (3) proof information for proving ownership of said another ID data, a specific service providing server, among the first service providing server to the n-th service providing server, acquiring another ID commitment corresponding to said another ID data from the blockchain network by using said another ID data acquired from the specific ID requesting transaction;

(b) the specific service providing server determining whether said another ID data is authenticated by referring to said another ID commitment acquired from the blockchain network and the proof information acquired from the specific ID requesting transaction; and (c) in response to said another ID data being authenticated, the specific service providing server confirming a specific user ID corresponding to a specific ID data generated by the specific service providing server, among the first ID data to the n-th ID data, included in the user data set, and then transmitting the confirmed specific user ID to said another service providing server.

2. The method of claim 1, wherein, before the step of (a), the method further comprises steps of:

(a1) in response to acquiring a user ID generating request from a user device of the user, the specific service providing server (i) generating the specific user ID corresponding to the user, (ii) generating the specific ID data obtained by processing the specific user ID, and (iii) generating specific server trap information by using a specific secret key of the specific service providing server; and (a2) the specific service providing server transmitting the specific ID data and the specific server trap information to a certification-supporting server, to thereby instruct the certification-supporting server to (i) generate a specific ID commitment by applying the operation of the commitment scheme on the specific ID data and the specific server trap information, (ii) register the specific ID commitment in the blockchain network, (iii) register the specific ID data in the blockchain network, and thus (iv) allow the specific ID data to correspond to the user data set.

3. The method of claim 1, wherein generators of the commitment scheme are represented as g and h, and said another ID commitment is represented as comm(another user ID)=$g\hat{}$(said another ID data)*$h\hat{}$(another secret key), wherein said $g\hat{}$(said another ID data) represents said g to the power of said another ID data, and wherein said $h\hat{}$(said another secret key) represents said h to the power of said another secret key, and wherein, at the step of (a), in response to said another service providing server (i) generating a random nonce x and a random nonce y and (ii) generating and transmitting first proof information $g\hat{}x*h\hat{}y$ corresponding to the random nonce x and the random nonce y by using the commitment scheme, the specific service providing server transmits a random nonce c to said another service providing server, and instructs said another service providing server to generate (2_1)-st proof information x'=x+c*(said another ID data) and (2_2)-nd proof information y'=y+c*(said another secret key) by referring to said another ID data, said another secret key, the random nonce x, the random nonce y, and the random nonce c, to thereby generate the proof information, and wherein, at the step of (b), the specific service providing server checks whether (1) a first reference value $g\hat{}x*h\hat{}y*$comm(said another ID data)$\hat{}$c generated by referring to the first proof information $g\hat{}x*h\hat{}y$ and said another ID commitment comm(said another ID data) and (2) a second reference value $g\hat{}x'*h\hat{}y'$ generated by referring to the (2_1)-st proof information x' and the (2_2)-nd proof information y' correspond with each other, thus authenticating said another ID data.

4. The method of claim 1, wherein generators of the commitment scheme are represented as g and h, and said another ID commitment is represented as comm(said another ID data)=$g\hat{}$(said another ID data)*$h\hat{}$(another secret key), wherein said $g\hat{}$(said another ID data) represents g to the power of said another ID data, and wherein said $h\hat{}$(said another secret key) represents h to the power of said another secret key, and wherein, at the step of (a), said another service providing server generates (i) a random nonce x and a random nonce y, (ii) first proof information $g\hat{}x*h\hat{}y$ corresponding to the random nonce x and the random nonce y by using the commitment scheme, (iii) a hash value c=hash($g\hat{}x*h\hat{}y$) by using the first proof information $g\hat{}x*h\hat{}y$, and (iv) (2_1)-st proof information x'=x+c*(said another ID data) and (2_2)-nd proof information y'=y+c*(said another secret key) by referring to said another ID data, said another secret key, the random nonce x, the random nonce y, and the hash value c, to thereby generate the proof information, and wherein, at the step of (b), the specific service providing server checks whether (1) a reference hash value hash($g\hat{}x'*h\hat{}y'$/comm(said another ID data)$\hat{}$c generated by referring to the (2_1)-st proof information x' and the (2_2)-nd proof information y', the hash value c, and said another ID commitment comm(said another ID data) and (2) the hash value c correspond with each other, thus authenticating said another ID data.

5. A method for managing a virtual common ID based on a blockchain network, comprising steps of:

(a) on condition that (i) each of a first user ID generated for a user by a first service providing server to an n-th user ID generated for the user by an n-th service providing server have been registered in each of a first service providing server to an n-th service providing server, wherein the first user ID to the n-th user ID are different user IDs, wherein the first user ID to the n-th user ID correspond to the user, and wherein the first service providing server to the n-th service providing server provide different services, (ii) a user data set including first ID data to n-th ID data, corresponding to a common ID data relating to the virtual common ID of the user, has been registered in the blockchain network, wherein the first ID data to the n-th ID data correspond to the first user ID to the n-th user ID, and (iii) each of a first ID commitment to an n-th ID commitment, each of which is generated by applying an operation of a commitment scheme on each of a first secret key and the first ID data to an n-th secret key and the n-th ID data corresponding to each of the first service providing server to the n-th service providing server, have been registered in the blockchain network, in response to acquiring, from another service providing server among the first service providing server to the n-th service providing server, a specific ID requesting transaction, corresponding to the user, including (1) another ID data corresponding to another user ID of the user and (2) proof information for proving ownership of said another ID data, a specific service providing server, among the first service providing server to the n-th service providing server, acquiring another ID commitment corresponding to said another ID data from the blockchain network by using said another ID data acquired from the specific ID requesting transaction;

(b) the specific service providing server determining whether said another ID data is authenticated by referring to said another ID commitment acquired from the blockchain network and the proof information acquired from the specific ID requesting transaction; and (c) in response to said another ID data being authenticated, the specific service providing server (i) acquiring the user data set including said another ID data from the blockchain network by using said another ID data included in the specific ID requesting transaction, (ii) confirming a specific user ID corresponding to a specific ID data generated by the specific service providing server, among the first ID data to the n-th ID data, included in the user data set, and then (iii) transmitting the confirmed specific user ID to said another service providing server.

6. The method of claim 5, wherein, before the step of (a), the method further comprises steps of:

(a1) in response to acquiring a user ID generating request from a user device of the user, the specific service providing server (i) generating the specific user ID corresponding to the user, (ii) generating the specific ID data obtained by processing the specific user ID, and (iii) generating specific server trap information by using a specific secret key of the specific service providing server; and (a2) the specific service providing server transmitting the specific ID data and the specific server trap information to a certification-supporting server, to thereby instruct the certification-supporting server to (i) generate a specific ID commitment by applying the operation of the commitment scheme on the specific ID data and the specific server trap information, (ii) register the specific ID commitment in the blockchain network, (iii) register the specific ID data in the blockchain network, and thus (iv) allow the specific ID data to correspond to the user data set.

7. The method of claim 5, wherein generators of the commitment scheme are represented as g and h, and said another ID commitment is represented as comm(said another ID data)=g^(said another ID data)*h^(another secret key), wherein said g^(said another ID data) represents g to the power of said another ID data, and wherein said h^(said another secret key) represents h to the power of said another secret key, and wherein, at the step of (a), in response to said another service providing server (i) generating a random nonce x and a random nonce y and (ii) generating and transmitting first proof information g^x*h^y corresponding to the random nonce x and the random nonce y by using the commitment scheme, the specific service providing server transmits a random nonce c to said another service providing server, and instructs said another service providing server to generate (2_1)-st proof information x'=x+c^(said another ID data) and (2_2)-nd proof information y'=y+c^(said another secret key) by referring to said another ID data, said another secret key, the random nonce x, the random nonce y, and the random nonce c, to thereby generate the proof information, and wherein, at the step of (b), the specific service providing server checks whether (1) a first reference value g^x*h^y*comm(said another ID data)^c generated by referring to the first proof information g^x*h^y and said another ID commitment comm(said another ID data) and (2) a second reference value g^x'*h^y' generated by referring to the (2_1)-st proof information x' and the (2_2)-nd proof information y' correspond with each other, thus authenticating said another ID data.

8. The method of claim 5, wherein generators of the commitment scheme are represented as g and h, and said another ID commitment is represented as comm(said another ID data)=g^(said another ID data)*h^(another secret key), wherein said g^(said another ID data) represents g to the power of said another ID data, and wherein said h^(said another secret key) represents h to the power of said another secret key, and wherein, at the step of (a), said another service providing server generates (i) a random nonce x and a random nonce y, (ii) first proof information g^x*h^y corresponding to the random nonce x and the random nonce y by using the commitment scheme, (iii) a hash value c=hash(g^x*h^y) by using the first proof information g^x*h^y, and (iv) (2_1)-st proof information x'=x+c*(said another ID data) and (2_2)-nd proof information y'=y+c*(said another secret key) by referring to said another ID data, said another secret key, the random nonce x, the random nonce y, and the hash value c, to thereby generate the proof information, and wherein, at the step of (b), the specific service providing server checks whether (1) a reference hash value hash(g^x'*h^y'/comm(said another ID data)^c) generated by referring to the (2_1)-st proof information x' and the (2_2)-nd proof information y', the hash value c, and said another ID commitment comm(said another ID data) and (2) the hash value c correspond with each other, thus authenticating said another ID data.

9. A specific service providing server, among a first service providing server to an n-th service providing server, for managing a virtual common ID based on a blockchain network, comprising:

at least one memory that stores instructions; and at least one processor configured to execute the instructions to perform processes of: (I) on condition that (i) each of a first user ID generated for a user by a first service providing server to an n-th user ID generated for the user by an n-th service providing server and each of a first ID data to an n-th ID data corresponding to each of the first user ID to the n-th user ID have been registered in each of the first service providing server to the n-th service providing server wherein the first user ID to the n-th user ID are different user IDs, wherein the first user ID to the n-th user ID correspond to the user, and wherein the first service providing server to the n-th service providing server provide different services, (ii) a user data set including the first ID data to the n-th ID data, corresponding to a common ID data relating to the virtual common ID of the user, has been registered in the blockchain network, and (iii) each of a first ID commitment to an n-th ID commitment, each of which is generated by applying an operation of a commitment scheme on each of a first secret key and the first ID data to an n-th secret key and the n-th ID data corresponding to each of the first service providing server to the n-th service providing server, have been registered in the blockchain network, in response to acquiring, from another service providing server among the first service providing server to the n-th service providing server, a specific ID requesting transaction, corresponding to the user, including (1) another ID data corresponding to another user ID of the user, (2) the user data set acquired from the blockchain network by using said another ID data a said another service providing server, and (3) proof information for proving ownership of said another ID data, acquiring another ID commitment corresponding to said another ID data from the blockchain network by using said another ID data acquired from the specific ID requesting transaction; (II) determining whether said another ID data is authenticated by referring to said another ID commitment acquired from the blockchain network and the proof information acquired from the specific ID requesting transaction; and (III) in response to said another ID data being authenticated, confirming a specific user ID corresponding to a specific ID data generated by the specific service providing server, among the first ID data to the n-th ID data, included in the user data set, and then transmitting the confirmed specific user ID to said another service providing server.

10. The specific service providing server of claim 9, wherein, before the process of (I), the processor further performs processes of: (I1) in response acquiring a user ID generating request from a user device of the user, (i) generating the specific user ID corresponding to the user, (ii) generating the specific ID data obtained by processing the specific user ID, and (iii) generating specific server trap information by using a specific secret key of the specific service providing server; and (I2) transmitting the specific ID data and the specific server trap information to a certification-supporting server, to thereby instruct the certification-supporting server to (i) generate a specific ID commitment by applying the operation of the commitment scheme on the specific ID data and the specific server trap information, (ii) register the specific ID commitment in the blockchain network, (iii) register the specific ID data in the blockchain network, and thus (iv) allow the specific ID data to correspond to the user data set.

11. The specific service providing server of claim 9, wherein generators of the commitment scheme are represented as g and h, and said another ID commitment is represented as comm(another user ID)=g^(said another ID data)*h^(another secret key), wherein said g^(said another ID data) represents said g to the power of said another ID data, and wherein said h^(said another secret key) represents said h to the power of said another secret key, and
  wherein, at the process of (I), in response to said another service providing server (i) generating a random nonce x and a random nonce y and (ii) generating and transmitting first proof information g^x*h^y corresponding to the random nonce x and the random nonce y by using the commitment scheme, the processor transmits a random nonce c to said another service providing server, and instructs said another service providing server to generate (2_1)-st proof information x'=x+c*(said another ID data) and (2_2)-nd proof information y'=y+c*(said another secret key) by referring to said another ID data, said another secret key, the random nonce x, the random nonce y, and the random nonce c, to thereby generate the proof information, and
  wherein, at the process of (II), the processor checks whether (1) a first reference value g^x*h^y*comm(said another ID data)^c generated by referring to the first proof information g^x*h^y and said another ID commitment comm(said another ID data) and (2) a second reference value g^x'*h^y' generated by referring to the (2_1)-st proof information x' and the (2_2)-nd proof information y' correspond with each other, thus authenticating said another ID data.

12. The specific service providing server of claim 9, wherein generators of the commitment scheme are represented as g and h, and said another ID commitment is represented as comm(said another ID data)=g^(said another ID data)*h^(another secret key), wherein said g^(said another ID data) represents g to the power of said another ID data and wherein said h^(said another secret key) represents h to the power of said another secret key, and
  wherein, at the process of (I), said another service providing server generates (i) a random nonce x and a random nonce y, (ii) first proof information g^x*h^y corresponding to the random nonce x and the random nonce y by using the commitment scheme, (iii) a hash value c=hash(g^x*h^y) by using the first proof information g^x*h^y, and (iv) (2_1)-st proof information x'=x+c*(said another ID data) and (2_2)-nd proof information y'=y+c*(said another secret key) by referring to said another ID data, said another secret key, the random nonce x, the random nonce y, and the hash value c, to thereby generate the proof information, and
  wherein, at the process of (II), the processor checks whether (1) a reference hash value hash(g^x'*h^y'/comm(said another ID data)^c) generated by referring to the (2_1)-st proof information x' and the (2_2)-nd proof information y', the hash value c, and said another ID commitment comm(said another ID data) and (2) the hash value c correspond with each other, thus authenticating said another ID data.

13. A specific service providing server, among a first service providing server to an n-th service providing server, for managing a virtual common ID based on a blockchain network, comprising:
  at least one memory that stores instructions; and
  at least one processor configured to execute the instructions to perform processes of: (I) on condition that (i) each of a first user ID generated for a user by a first service providing server to an n-th user ID generated for the user by an n-th service providing server have been registered in each of the first service providing server to the n-th service providing server, wherein the first user ID to the n-th user ID are different user IDs, wherein the first user ID to the n-th user ID correspond to the user, and wherein the first service providing server to the n-th service providing server provide different services, (ii) a user data set including first ID data to n-th ID data, corresponding to a common ID data relating to the virtual common ID of the user, has been registered in the blockchain network, wherein the first ID data to the n-th ID data correspond to the first user ID to the n-th user ID, and (iii) each of a first ID commitment to an n-th ID commitment, each of which is generated by applying an operation of a commitment scheme on each of a first secret key and the first ID data to an n-th secret key and the n-th ID data corresponding to each of the first service providing server to the n-th service providing server, have been registered in the blockchain network, in response to acquiring, from another service providing server among the first service providing server to the n-th service providing server, a specific ID requesting transaction, corresponding to the user, including (1) another ID data corresponding to another user ID of the user and (2) proof information for proving ownership of said another ID data, acquiring another ID commitment corresponding to said another ID data from the blockchain network by using said another ID data acquired from the specific ID requesting transaction; (II) determining whether said another ID data is authenticated by referring to said another ID commitment acquired from the blockchain network and the proof information acquired from the specific ID requesting transaction; and (III) in response to said another ID data being authenticated, (i) acquiring the user data set including said another ID data from the blockchain network by using said another ID data included in the specific ID requesting transaction, (ii) confirming a specific user ID corresponding to a specific ID data generated by the specific service providing server, among the first ID data to the n-th ID data, included in the user data set, and then (iii) transmitting the confirmed specific user ID to said another service providing server.

14. The specific service providing server of claim 13, wherein, before the process of (I), the processor further performs processes of: (I1) in response to acquiring a user ID generating request from a user device of the user, (i) generating the specific user ID corresponding to the user, (ii) generating the specific ID data obtained by processing the specific user ID, and (iii) generating specific server trap information by using a specific secret key of the specific service providing server; and (I2) transmitting the specific ID data and the specific server trap information to a certification-supporting server, to thereby instruct the certification-supporting server to (i) generate a specific ID commitment by applying the operation of the commitment scheme on the specific ID data and the specific server trap information, (ii) register the specific ID commitment in the blockchain network, (iii) register the specific ID data in the blockchain network, and thus (iv) allow the specific ID data to correspond to the user data set.

15. The specific service providing server of claim 13, wherein generators of the commitment scheme are represented as g and h, and said another ID commitment is represented as comm(said another ID data)=g^(said another ID data)*h^(another secret key), wherein said g^(said another ID data) represents g to the power of said another ID data, and wherein said h^(said another secret key) represents h to the power of said another secret key, and wherein, at the process of (I), in response to said another service providing server (i) generating a random nonce x and a random nonce y and (ii) generating and transmitting first proof information g^x*h^y corresponding to the random nonce x and the random nonce y by using the commitment scheme, the processor transmits a random nonce c to said another service providing server, and instructs said another service providing server to generate (2_1)-st proof information x'=x+c^(said another ID data) and (2_2)-nd proof information y'=y+c^(said another secret key) by referring to said another ID data, said another secret key, the random nonce x, the random nonce y, and the random nonce c, to thereby generate the proof information, and wherein, at the process of (II), the processor checks whether (1) a first reference value g^x h^y*comm(said another ID data)^c generated by referring to the first proof information g^x*h^y and said another ID commitment comm(said another ID data) and (2) a second reference value g^x' *h^y' generated by referring to the (2_1)-st proof information x' and the (2_2)-nd proof information y' correspond with each other, thus authenticating said another ID data.

16. The specific service providing server of claim 13, wherein generators of the commitment scheme are represented as g and h, and said another ID commitment is represented as comm(said another ID data)=g^(said another ID data)*h^(another secret key), wherein said g^(said another ID data) represents g to the power of said another ID data, and wherein said h^(said another secret key) represents h to the power of said another secret key, and wherein, at the process of (I), said another service providing server generates (i) a random nonce x and a random nonce y, (ii) first proof information g^x*h^y corresponding to the random nonce x and the random nonce y by using the commitment scheme, (iii) a hash value c=hash(g^x*h^y) by using the first proof information g^x*h^y, and (iv) (2_1)-st proof information x'=x+c*(said another ID data) and (2_2)-nd proof information y'=y+c*(said another secret key) by referring to said another ID data, said another secret key, the random nonce x, the random nonce y, and the hash value c, to thereby generate the proof information, and wherein, at the process of (II), the processor checks whether (1) a reference hash value hash(g^x'*h^y'/comm(said another ID data)^c generated by referring to the (2_1)-st proof information x' and the (2_2)-nd proof information y', the hash value c, and said another ID commitment comm(said another ID data) and (2) the hash value c correspond with each other, thus authenticating said another ID data.

\* \* \* \* \*